United States Patent [19]

King

[11] 4,187,958
[45] Feb. 12, 1980

[54] FLOW PROPORTIONAL CONVEYOR DRIVE SYSTEM

[75] Inventor: Donald A. King, Camarillo, Calif.

[73] Assignee: Abex Corporation, New York, N.Y.

[21] Appl. No.: 954,701

[22] Filed: Sep. 12, 1978

[51] Int. Cl.² ............................................. B65G 43/00
[52] U.S. Cl. .................................... 222/57; 198/855; 198/859; 222/63
[58] Field of Search ............... 198/810, 855, 858, 859, 198/832–835; 222/57, 59, 63; 177/121; 406/79, 80, 81, 30, 31; 137/100, 101.19, 101.21

[56] References Cited
U.S. PATENT DOCUMENTS

| 2,072,442 | 3/1937 | Collins | 222/57 X |
|---|---|---|---|
| 2,527,136 | 10/1950 | Kagi et al. | 222/57 X |
| 3,338,377 | 8/1967 | Richter et al. | 198/859 |
| 3,412,699 | 11/1968 | Culp et al. | 110/101 R |
| 3,691,838 | 9/1972 | Kalotay | 73/231 M |
| 3,751,644 | 8/1973 | Mayer | 235/92 FL X |
| 4,043,195 | 8/1977 | Hunting | 73/204 |

Primary Examiner—James L. Rowland
Attorney, Agent, or Firm—Thomas S. Baker, Jr.; David A. Greenlee

[57] ABSTRACT

A digital, open loop control system for a very low speed conveyor which deposits contaminants in a fluid used to test a hydraulic component. The digital control system senses the rate of fluid flow through the component and advances the conveyor in proportion to the fluid flow rate.

1 Claim, 2 Drawing Figures

FLOW PROPORTIONAL CONVEYOR DRIVE SYSTEM

BACKGROUND OF THE INVENTION

This invention relates to a digital, open loop control system for a conveyor drive which advances the conveyor in small increments.

DESCRIPTION OF THE PRIOR ART

Hydraulic components, such as main engine fuel pumps, ancillary pumps, motors and valves which are supplied to the government, must pass a variety of military qualification tests before they are accepted. In the endurance portion of a qualification test for fuel system components, specified quantities of contaminants are added to the engine fuel and the effects of these contaminants on the performance of a test component as the fuel flows through the component are observed and measured. The quantity of an individual contaminant may range from 0.1–20 grams per thousand gallons of fuel.

To perform the tests, it is desirable to add a continuous, fresh supply of contaminants to the fuel immediately upstream of the component being tested and then filter the fuel to remove the contaminants downstream of the component. In this manner, the filtered fuel can be reused during the test and the contaminants in the fuel are more uniform in terms of size and shape than if they were left in the fluid and cycled through the component.

The recommended procedure for adding contaminants to the fuel is to evenly distribute the specified contaminants on a conveyor belt and advance the belt so that the contaminants drop into the fuel. The conveyor belt speed is arranged to be proportional to the instantaneous flow rate of the fuel through the test component. In this way, the specified percent of contaminant mixture for a unit volume of fuel is maintained regardless of variations in the rate of flow of engine fuel to the test component.

A conveyor drive system which is controlled by an analog-type, feedback, servo system is suitable for a conveyor which supplies contaminants to the fuel used to test a component which consumes fluid at a relatively high rate in the qualification tests. For example, in a qualification test of a main engine fuel pump, a thousand gallons of fuel may pass through the fuel pump in one hour. A conveyor six feet long may be used to add contaminants to the fuel during the test. Such a conveyor would advance at an average rate of twelve inches per hour. At this speed, a satisfactory error signal can be produced and a closed loop servo system will operate satisfactorily despite the side effects from such a system. Examples of the side effects inherent in closed loop systems are overshoot, creep, hysteresis, hunting, thermal effects, voltage variations and low frequency response to small error signals.

Ancillary hydraulic controls used in fuel systems operate and must be tested at relatively low fluid flow rates. Some components, such as servovalves, operate at a maximum flow rate of approximately five gallons of fluid per hour and a 200 hour test is necessary to pass one thousand gallons of fuel through the component. Consequently, the speed of a conveyor belt used to add contaminants to the fuel during a qualification test is relatively low. If a small conveyor, for example, one approximately twelve inches long, is used to add contaminants to the fuel during a test, a conveyor belt speed or feed rate of between 0.0001 to 0.0010 inches per minute is required. Also, the fluid flow may be stopped during the test and the conveyor belt must remain stationary during this time.

It has been found that the conventional analog, closed loop, feedback servo systems, such as shown in U.S. Pat. Nos. 3,412,699; 4,043,195; 3,751,644 and 3,691,838, are unsuitable for controlling a drive which advances a conveyor at very slow rates. In order to provide a feedback signal for a conveyor which advances at the very low speeds described above, large gear ratios would be needed to amplify the conveyor belt movement, since the error signal would be very small. The gears would have backlash and high inertia, which would adversely affect the accuracy of the drive. Also, the electrical noise produced by the electronic components may be greater than the error signal produced from the conveyor. Any system which would be affected by thermal effects, voltage variation or noise, and which advances the conveyor drive when the fluid flow through the test component is zero, is unacceptable, since dumping contaminants in a static fluid results in uneven contaminant distribution in the fluid and causes inaccurate contamination test results. Consequently, it has been found that a conventional analog, servo system cannot be scaled down satisfactorily to control a drive system for a conveyor which must be advanced in very small increments at very low speeds.

In the instant invention, a conveyor belt is advanced at low speeds and in proportion to the instantaneous rate of fluid flow through a hydraulic component by a digital, open loop system which senses the flow rate of the fluid through a test component and operates a device which controls a mechanical conveyor drive.

DESCRIPTION OF THE PREFERRED EMBODIMENT

Figure 1:
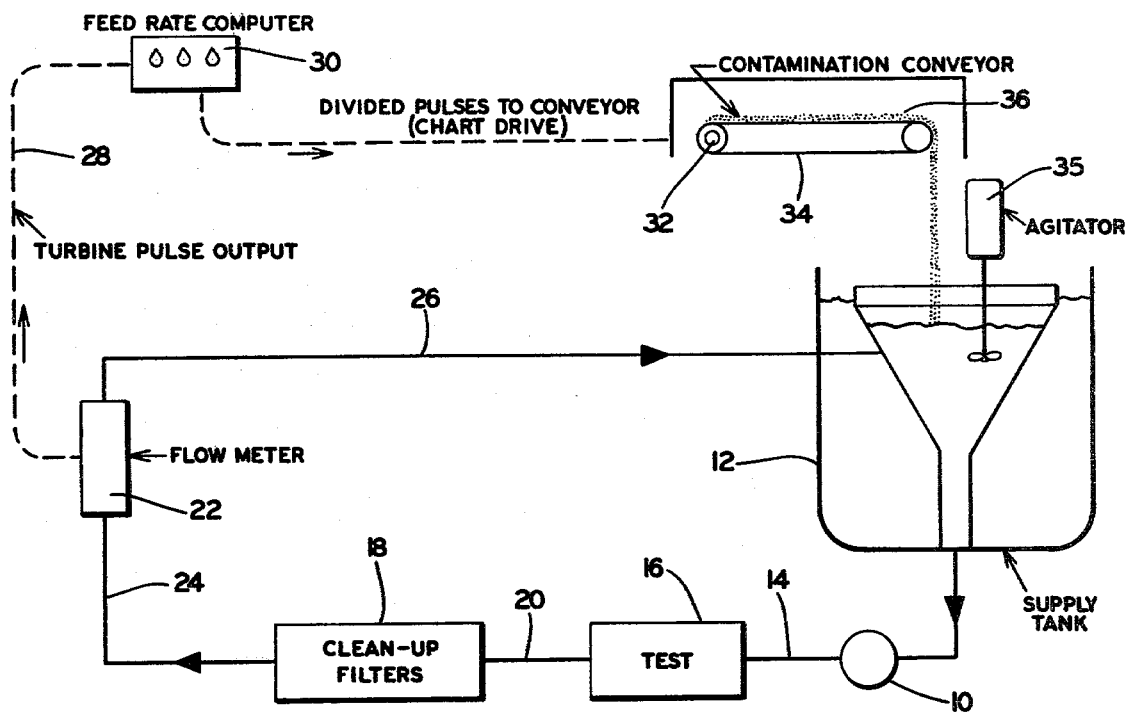
FIG. 1 is a schematic diagram showing the operation of a conveyor which dispenses contaminant particles into a test system for a hydraulic component and is controlled by an open loop, digital control system.

The apparatus used in the endurance portion of a qualification test of a fuel system component is shown in FIG. 1. In this test, specified quantities of contaminants are added to engine fuel and the effects of the contaminants on the component as the fuel flows through it are observed and measured.

A pump 10 pumps contaminated hydraulic fluid, such as engine fuel, out of a supply tank 12 and into a line 14 which is connected to the hydraulic component, such as a servovalve, which is being tested. The fluid passes through the test component 16 and into a line 20 which is connected to a filter 18 which removes the particulate contaminants from the hydraulic fluid. This enables the fluid to be reused and allows a fresh supply of contaminants to be placed in the fluid immediately before it passes through the test component 16.

A flow meter 22, which senses the rate of flow of hydraulic fluid in the system, which is also the instantaneous fluid flow rate through component 16, is connected to filter 18 by a line 24 and to the supply tank 12 by a line 26. Flow meter 22 sends a pulsating electronic signal proportional to the flow rate of the fluid through a line 28 to a programmable pulse divider or feed rate computer 30. The pulse divider 30 divides the pulsating output from flow meter 22 by a preset integer in order to provide a proper signal to a mechanism 32 which advances a conveyor belt 34 which drops contaminant particles 36 into the supply tank 12. The contaminant particles are disposed on conveyor belt 34 before the test is begun. An agitator 35 mixes the contaminants in the fluid.

Figure 2:
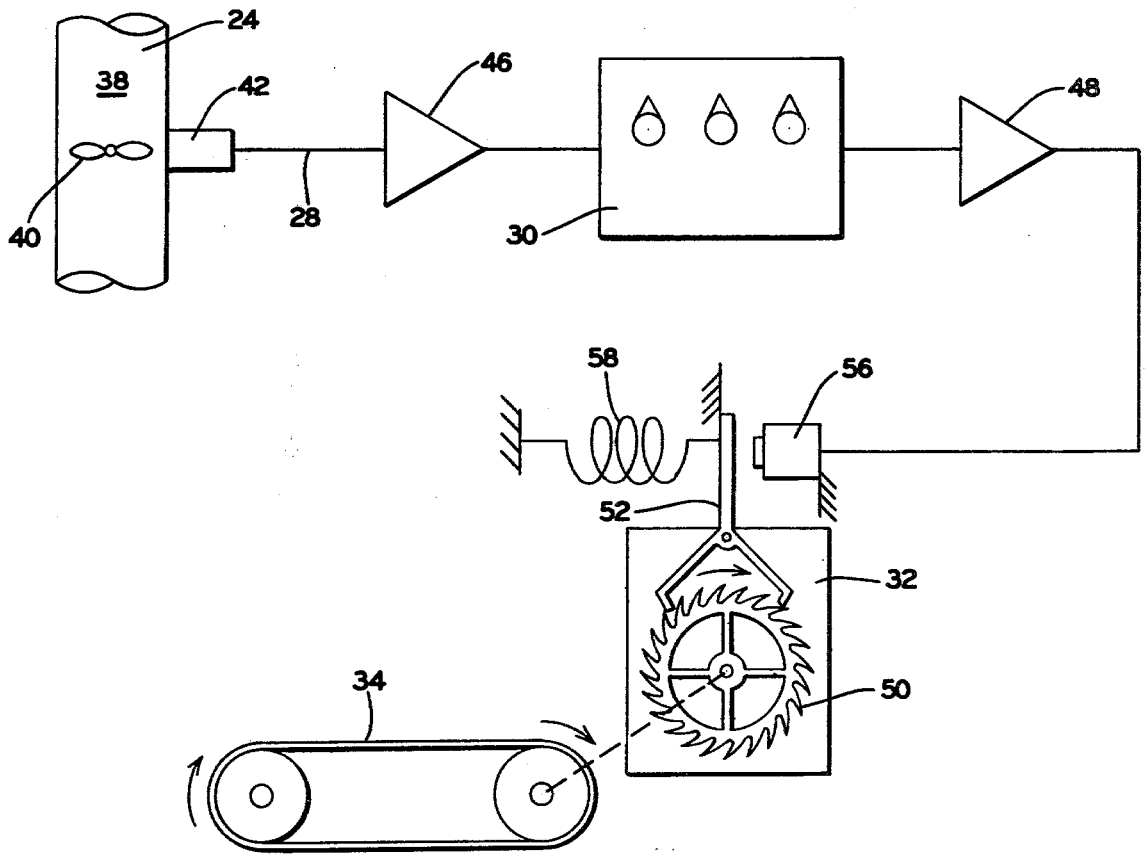
FIG. 2 is a schematic diagram of the open loop, digital control system which controls the drive that advances the conveyor.

Referring to FIG. 2, the open loop, digital control system for the conveyor advance mechanism will be described in greater detail. The flow meter 22 includes a turbine wheel 38 which has a plurality of blades 40 and is positioned in conduit 24. The turbine wheel 38 is a positive displacement device and the blades 40 rotate at a velocity directly proportional to the volumetric flow of fluid through conduit 24 which is substantially indentical to the flow of fluid through the test component 16. The flow meter 22 includes a transducer pickup probe 42 which senses the passage of each blade and generates a voltage pulse accordingly. A typical commercial flow meter, such as used in this invention, produces approximately 30,000 voltage pulses per gallon of fluid. The voltage pulses from transducer 42 pass through line 28 to an amplifier 46. The amplifier 46 strengthens and otherwise conditions the pulses to provide an acceptable input to the programmable pulse divider 30.

In the instant invention, the pulse divider 30 is a three decade unit which is commercially available. The purpose of the pulse divider 30 is to divide the incoming train of voltage pulses from the flow meter 22 by a set integer from 1–999 to provide an acceptable signal to the device which operates the conveyor advance mechanism. For one gallon of fluid flow through the flow meter 22, the pulse divider 30 can be set to deliver from a minimum of 30 pulses to a maximum of 30,000 pulses, depending upon the divider setting, and assuming the flow meter 22 produces 30,000 pulses per passage of one gallon of fluid, as previously mentioned.

The pulse divider 30 is connected to a second amplifier 48 which conditions and amplifies the voltage pulse output by divider 30 to the level necessary to operate a solenoid which actuates the conveyor advance mechanism 32. In the instant invention, the conveyor advance mechanism is a wound spring device, identical to that used in commercially available, portable recorders of the type used in making ink recordings of transient or varying electrical phenomena. In this embodiment, a wound spring mechanism, not shown, advances conveyor 34 and is connected to a gear 50. Gear 50 is engaged by an escapement lever 52. Adjacent to lever 52 is a small, electromagnetic solenoid 56 which attracts lever 52 such that one gear tooth is allowed to escape as the lever 52 moves each time solenoid 56 receives a voltage pulse from amplifier 48. A return spring 58 resets the escapement lever 52 when solenoid 56 is de-energized.

In the instant invention, a single pulse applied to solenoid 56 results in a forward advance of 0.0001 inches for conveyor belt 34. Successive pulses similarly applied to solenoid 56 will produce a conveyor belt rate of advance proportional to the frequency of the pulses. It has been found that the upper operating limit of solenoid 56 and escapement lever 52 is four cycles per second. This results in a maximum forward rate of advance of 0.024 inches per minute for conveyor belt 34. This upper limit is entirely satisfactory for tests of long duration.

It is apparent that the digital, open loop conveyor drive system of this invention provides a highly accurate conveyor feed rate proportional to the flow rate of fluid through a component where very low flow rates and small conveyor feed rates are involved.

Obviously, those skilled in the art may make various changes in the detailed arrangement of parts without departing from the spirit and scope of the invention as it is defined by the claims hereto appended.

I claim:

1. An open loop, low speed conveyor drive system comprising a conveyor; a mechanical, wound spring drive for advancing the conveyor, said spring drive including an escapement mechanism which advances the conveyor in discrete increments; an electrically operated solenoid which operates the escapement mechanism; a fluid conduit; a turbine flow meter in the conduit; a transducer which senses the passage of the turbine blades and generates voltage pulses proportional to the flow of fluid in the conduit; an amplifier which receives the voltage pulses from the transducer and conditions them; a pulse divider which receives the conditioned pulses, the pulse divider having means for dividing the incoming conditioned pulses by a set integer and providing divided output voltage pulses; a second amplifier for conditioning the divided voltage pulses; means conducting the second conditioned voltage pulses to the solenoid, wherein the solenoid is actuated once to operate the escapement mechanism once to advance the conveyor one increment each time the solenoid receives a second conditioned voltage pulse.

* * * * *